US010817385B2

(12) United States Patent
Meiri et al.

(10) Patent No.: US 10,817,385 B2
(45) Date of Patent: Oct. 27, 2020

(54) STORAGE SYSTEM WITH BACKUP CONTROL UTILIZING CONTENT-BASED SIGNATURES

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 198 days.

(21) Appl. No.: 16/050,051

(22) Filed: Jul. 31, 2018

(65) Prior Publication Data

US 2020/0042401 A1 Feb. 6, 2020

(51) Int. Cl.
*G06F 7/00* (2006.01)
*G06F 17/00* (2019.01)
*G06F 11/14* (2006.01)
*G06F 16/22* (2019.01)

(52) U.S. Cl.
CPC ...... *G06F 11/1464* (2013.01); *G06F 16/2246* (2019.01); *G06F 16/2255* (2019.01); *G06F 2201/84* (2013.01)

(58) Field of Classification Search
None
See application file for complete search history.

(56) References Cited

U.S. PATENT DOCUMENTS

| 7,444,464 | B2 | 10/2008 | Urmston et al. |
| 8,095,726 | B1 | 1/2012 | O'Connell et al. |
| 8,214,612 | B1 | 7/2012 | Natanzon |
| 9,104,326 | B2 | 8/2015 | Frank et al. |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Tuan A Pham
(74) *Attorney, Agent, or Firm* — Ryan, Mason & Lewis, LLP (57) ABSTRACT

A content addressable storage system in one embodiment comprises a plurality of storage devices and a storage controller. The content addressable storage system is configured to receive from another storage system a plurality of snapshots for at least one storage volume designated for backup from the other storage system to the content addressable storage system. For each of a plurality of pages of a given one of the snapshots, the content addressable storage system generates a content-based signature for the page, compares the content-based signature for the page to a previous content-based signature generated for a corresponding page having the same address in a previous one of the snapshots, and stores the page of the given snapshot in one or more of the storage devices of the content addressable storage system responsive to an absence of a match between the compared content-based signatures. The content-based signatures illustratively comprise respective hash handles.

20 Claims, 6 Drawing Sheets

(56) References Cited

U.S. PATENT DOCUMENTS

| | | | |
|---|---|---|---|
| 9,208,162 B1 | 12/2015 | Hallak et al. | |
| 9,286,003 B1 | 3/2016 | Hallak et al. | |
| 9,606,870 B1* | 3/2017 | Meiri | G06F 11/1092 |
| 9,716,754 B2 | 7/2017 | Swift | |
| 2008/0279462 A1 | 11/2008 | Celi, Jr. | |
| 2009/0132955 A1* | 5/2009 | Garg | H04L 9/3247 |
| | | | 715/781 |
| 2010/0179941 A1 | 7/2010 | Agrawal et al. | |
| 2012/0311280 A1* | 12/2012 | Schmidt | G06F 11/1469 |
| | | | 711/162 |
| 2013/0325824 A1* | 12/2013 | Shoens | G06F 16/16 |
| | | | 707/698 |
| 2014/0181016 A1 | 6/2014 | Whitehead et al. | |
| 2016/0077926 A1* | 3/2016 | Mutalik | G06F 11/1456 |
| | | | 711/162 |
| 2016/0150012 A1 | 5/2016 | Barszczak et al. | |
| 2016/0170987 A1 | 6/2016 | Kesselman | |
| 2016/0202927 A1* | 7/2016 | Klarakis | G06F 3/0619 |
| | | | 709/217 |
| 2016/0224259 A1 | 8/2016 | Ahrens et al. | |
| 2017/0192857 A1 | 7/2017 | Meiri et al. | |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

STORAGE SYSTEM WITH BACKUP CONTROL UTILIZING CONTENT-BASED SIGNATURES

FIELD

The field relates generally to information processing systems, and more particularly to storage in information processing systems.

BACKGROUND

Storage volumes of storage arrays or other types of storage systems in an information processing system are typically backed up to one or more other storage systems for disaster recovery and other data protection purposes. In such arrangements, complete point-in-time (PIT) replicas of a set of one or more storage volumes subject to a given backup process within the information processing system may be periodically sent from a primary storage system to a backup storage system. The backup storage system in many cases is configured to store these complete PIT replicas as received. Unfortunately, these and other conventional arrangements can be highly wasteful of storage resources of the backup storage system. Even in those implementations in which the backup storage system has deduplication functionality that can be applied to the PIT replicas, it remains necessary to store substantial amounts of corresponding metadata, typically in a memory of the backup storage system, leading to excessive consumption of memory resources of the backup storage system.

SUMMARY

Illustrative embodiments utilize content-based signatures to provide efficient backup control in a content addressable storage system that serves as a backup storage system relative to a primary storage system. For example, one or more such embodiments can be advantageously configured to allow at least one storage volume of a generic storage array or other type of generic storage system that does not have content addressable storage functionality to be backed up in a content addressable storage system. Such arrangements can automatically avoid storage of duplicate pages detected in multiple snapshots of the storage volume, while also reducing the amount of memory needed to store content-based signatures, thereby conserving both storage and memory resources in the backup process.

In one embodiment, a content addressable storage system comprises a plurality of storage devices and a storage controller. The content addressable storage system is configured to receive from another storage system a plurality of snapshots for at least one storage volume designated for backup from the other storage system to the content addressable storage system. For each of a plurality of pages of a given one of the snapshots, the content addressable storage system generates a content-based signature for the page, compares the content-based signature for the page to a previous content-based signature generated for a corresponding page having the same address in a previous one of the snapshots, and stores the page of the given snapshot in one or more of the storage devices of the content addressable storage system responsive to an absence of a match between the compared content-based signatures. The content-based signatures illustratively comprise respective hash handles.

The storage volume illustratively comprises at least one logical storage volume of the other storage system. The term "storage volume" as used herein is therefore intended to be broadly construed, so as to encompass a set of one or more logical storage volumes.

In some embodiments, the other storage system comprises a generic storage system without content addressable storage functionality.

The previous one of the snapshots referred to above illustratively comprises a snapshot immediately preceding the given snapshot in a sequence of snapshots for the storage volume received from the other storage system.

The content addressable storage system is configured in some embodiments to store the received snapshots for the storage volume in a tree structure in which the snapshots are designated as collectively comprising a snapshot group. For example, the given snapshot may be designated as a child snapshot of the snapshot group in the tree structure relative to the previous snapshot which is designated as a parent snapshot of the snapshot group in the tree structure. Each of one or more child snapshots of the snapshot group in the tree structure is illustratively stored in the content addressable storage system without storing those pages of the child snapshot that have respective content-based signatures that are the same as those of corresponding pages of a parent snapshot of the snapshot group in the tree structure.

In some embodiments, the content-based signatures are generated by applying a designated hash function to content of respective ones of the pages. For example, the content-based signatures may comprise respective hash handles of the pages.

One or more illustrative embodiments are configured such that a page of a given one of the snapshots is not stored in one or more of the storage devices of the content addressable storage system if its content-based signature matches the previous content-based signature generated for a corresponding page having the same address in a previous one of the snapshots.

Additionally or alternatively, one or more illustrative embodiments are configured such that a content-based signature generated for a page of a given one of the snapshots is not stored in a signature memory of the content addressable storage system if that content-based signature matches the previous content-based signature generated for a corresponding page having the same address in a previous one of the snapshots.

Illustrative embodiments include a clustered implementation of a content addressable storage system having a distributed storage controller. Similar advantages can be provided in other types of content addressable storage systems.

The content addressable storage system in some embodiments is implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
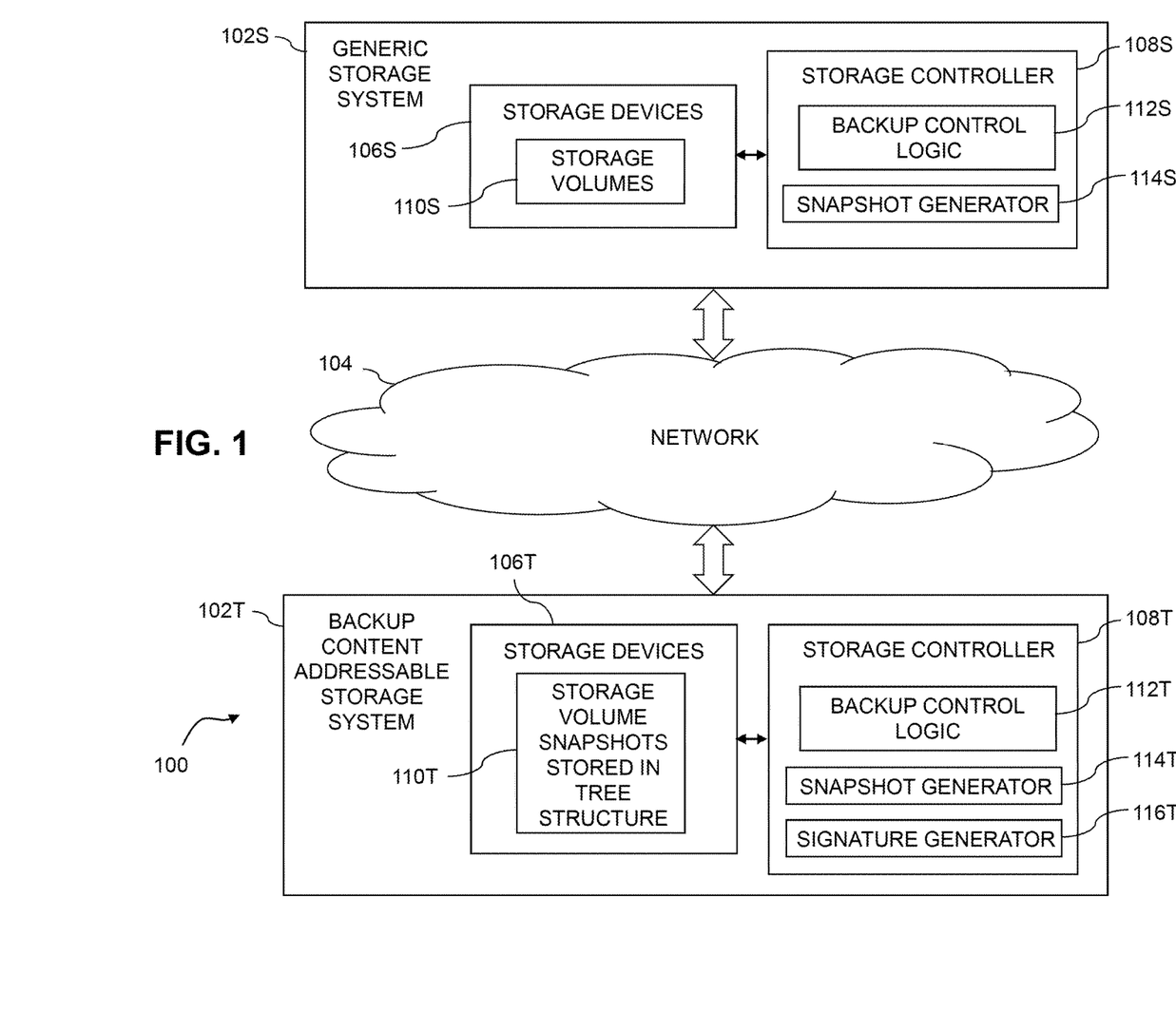
FIG. 1 is a block diagram of an information processing system comprising a backup storage system in the form of a content addressable storage system with functionality for backup control utilizing content-based signatures in an illustrative embodiment.

FIG. 1 shows an information processing system 100 configured in accordance with an illustrative embodiment. The information processing system 100 comprises a source storage system 102S and a target storage system 102T configured to communicate over a network 104. The source and target storage systems 102 are configured in this embodiment to participate in a backup process that utilizes snapshots sent from the source storage system 102S to the target storage system 102T.

The source storage system 102S in this embodiment more particularly comprises a generic storage array or other type of generic storage system that does not include content addressable storage functionality, while the target storage system 102T more particularly comprises a content addressable storage system that serves to back up at least portions of the data stored in the source storage system 102S. Other types of source and target storage systems can be used in other embodiments.

Each of the storage systems 102 is illustratively associated with a corresponding set of one or more host devices, although such host devices are not shown in the figure. The host devices illustratively comprise servers or other types of computers of an enterprise computer system, cloud-based computer system or other arrangement of multiple compute nodes associated with respective users. The host devices in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to stored data of a given one of the storage systems 102.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The above-noted host devices are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source storage system 102S comprises a plurality of storage devices 106S and an associated storage controller 108S. The storage devices 106S store storage volumes 110S. The storage volumes 110S illustratively comprise respective logical units (LUNs) or other types of logical storage volumes.

Similarly, the target storage system 102T comprises a plurality of storage devices 106T and an associated storage controller 108T. The storage devices 106T store storage volumes 110T, at least a portion of which represent respective LUNs or other types of logical storage volumes that are backed up from the source storage system 102S utilizing storage volume snapshots stored in a tree structure.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the target storage system 102T illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 102 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108S of source storage system 102S in the FIG. 1 embodiment includes backup control logic 112S and a snapshot generator 114S. The source storage system 102S in the present embodiment is assumed to comprise a generic storage system without content addressable storage functionality and therefore does not include a signature generator suitable for generating content-based signatures of respective pages of one or more of the storage volumes 110.

The storage controller 108T of target storage system 102T includes backup control logic 112T, a snapshot generator 114T and a signature generator 116T.

The backup control logic 112 of the storage systems 102 controls performance of a backup process carried out between those storage systems. For example, the backup control logic 112 is illustratively configured to control the performance of one or more of the steps of the backup process illustrated in the flow diagram of FIG. 2.

The data backup up from the source storage system 102S to the target storage system 102T can include all of the data stored in the source storage system 102S, or only certain designated subsets of the data stored in the source storage system 102S, such as particular designated sets of LUNs or other logical storage volumes. Different backup processes of different types can be implemented for different parts of the stored data.

A given storage volume designated for backup from the source storage system 102S to the target storage system 102T illustratively comprises a set of one or more LUNs or other instances of the storage volumes 110S of the source storage system 102S. Each such LUN or other storage volume illustratively comprises at least a portion of a physical storage space of one or more of the storage devices 106S. The corresponding LUN or other storage volume of the backup storage volumes 110T of the target storage system 102T illustratively comprises at least a portion of a physical storage space of one or more of the storage devices 106T.

Figure 2:
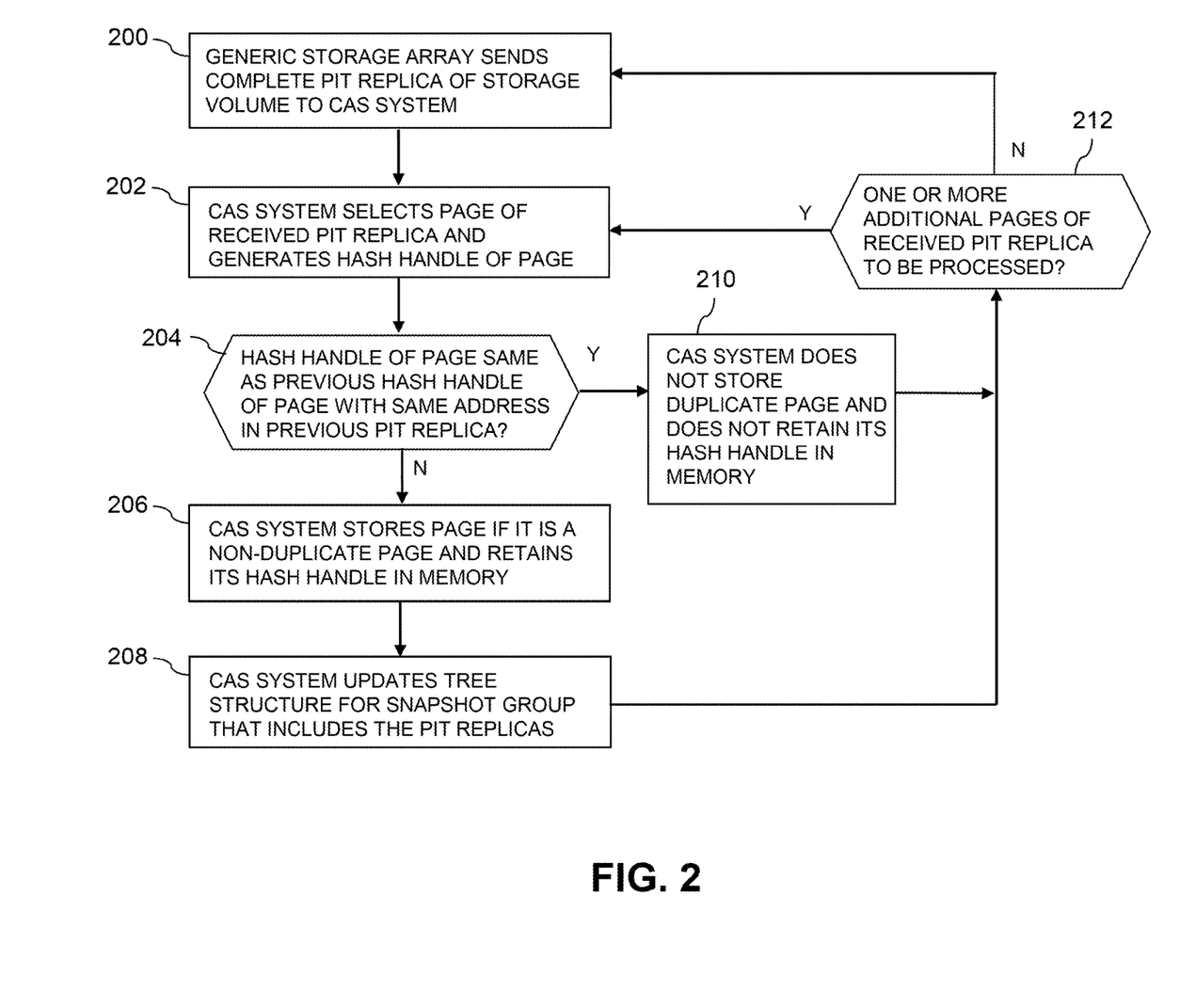
FIG. 2 is a flow diagram of a process for backup control utilizing content-based signatures in an illustrative embodiment.

As noted above, the backup control logic 112 of the storage systems 102 in some embodiments is configured to control performance of one or more backup processes such as that illustrated in the flow diagram of FIG. 2, utilizing hash handles or other types of content-based signatures.

The storage controllers 108 of the storage systems 102 should also be understood to include additional modules and other components typically found in conventional implementations of storage controllers and storage systems, although such additional modules and other components are omitted from the figure for clarity and simplicity of illustration.

In conjunction with a given backup process implemented between the source storage system 102S and the target storage system 102T in the system 100, the target storage system 102T is configured to receive from the source storage system 102S a plurality of snapshots for at least one of the storage volumes 110S designated for backup from the source storage system 102S to the target storage system 102T.

For each of a plurality of pages of a given one of the snapshots, the target storage system 102T generates a content-based signature for the page, compares the content-based signature for the page to a previous content-based signature generated for a corresponding page having the same address in a previous one of the snapshots, and stores the page of the given snapshot in one or more of the storage devices 106T of the target storage system 102T responsive to an absence of a match between the compared content-based signatures.

The previous one of the snapshots illustratively comprises a snapshot immediately preceding the given snapshot in a sequence of snapshots for the storage volume received from the source storage system 102S. However, other embodiments can utilize snapshots that are in different relative sequential positions.

The target storage system 102T is configured to store the received snapshots for the storage volume in a tree structure in which the snapshots are designated as collectively comprising a snapshot group. The term "snapshot group" as used herein is intended to be broadly construed so as to encompass a set of snapshots generated over time for a particular storage volume or set of storage volumes. Individual snapshots of the snapshot group illustratively correspond to respective PIT replicas of the storage volume or set of storage volumes.

A given such tree structure illustratively stores at least one snapshot group comprising a plurality of snapshots having parent-child relationships and other types of ancestor relationships. For example, a given snapshot may be designated as a child snapshot of the snapshot group in the tree structure relative to a previous snapshot which is designated as a parent snapshot of the snapshot group in the tree structure.

Each of one or more child snapshots of the snapshot group in the tree structure is stored in the target storage system 102T without storing those pages of the child snapshot that have respective content-based signatures that are the same as those of corresponding pages of a parent snapshot of the snapshot group in the tree structure.

A more detailed example of an illustrative embodiment of a tree structure for storing snapshots of a snapshot group in accordance with their ancestor relationships will be described below in conjunction with FIG. 3.

The content-based signatures in some embodiments are generated by applying a designated hash function such as the well-known Secure Hashing Algorithm 1 (SHA1) to content of respective ones of the pages. For example, content-based signatures illustratively comprise hash digests of their respective pages, each generated by application of a hash function. It is also possible that other types of content-based signatures may be used, such as hash handles of the type described elsewhere herein. A given content-based signature in illustrative embodiments is unique to the particular content of the page from which it is generated, such that two pages with exactly the same content will have the same content-based signature, while two pages with different content will have different content-based signatures.

In some embodiments, a given page of a particular one of the snapshots received from the source storage system 102S is not stored in one or more of the storage devices 106T of the target storage system 102T if the content-based signature of the page matches the previous content-based signature generated for the corresponding page having the same logical address in a previous one of the snapshots.

Additionally or alternatively, the content-based signature generated for the given page is not stored in a signature memory of the target storage system 102T if that content-based signature matches the previous content-based signature generated for the corresponding page having the same logical address in the previous one of the snapshots.

In some embodiments, the tree structure utilized to store the snapshots for a snapshot group comprises a snapshot tree constructed for the storage volume.

Other types of tree structures implemented using a wide variety of alternative data structures such as tables can be used to store information characterizing snapshots of a snapshot group in other embodiments.

The above-described arrangements allow at least one storage volume of a generic storage array or other type of generic storage system such as source storage system 102S that does not have content addressable storage functionality to be backed up in a content addressable storage system such as target storage system 102T.

Such arrangements can automatically avoid storage of duplicate pages in multiple snapshots of the storage volume, while also reducing the amount of memory needed to store content-based signatures, thereby conserving both storage and memory resources of the target storage system 102T in the backup process.

The backup process in some embodiments provides highly efficient storage of snapshots of a snapshot group utilizing content-based signatures to provide deduplication functionality not otherwise available in the generic storage system.

Various automated actions may be taken in at least one of the storage systems 102 and/or their associated host devices based at least in part on snapshots generated in conjunction with a backup process of the type described above. For example, the snapshots are utilized in some embodiments to allow users of the source storage system 102S to implement disaster recovery operations utilizing the backup storage volumes of the target storage system 102T. Such disaster recovery illustratively involves automated rollback of one or more storage volumes to a previous point in time.

The above-described operations carried out in conjunction with a process for backup control utilizing content-based signatures in the storage systems 102 are illustratively performed at least in part under the control of the backup control logic 112. As is apparent from the foregoing description, such operations utilize the associated snapshot generators 114 and the signature generator 116T.

The storage systems 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as storage systems 102, network 104, storage devices 106, storage controllers 108 and storage volumes 110 can be used in other embodiments.

It should be understood that the particular sets of modules and other components implemented in the system 100 as illustrated in FIG. 1 are presented by way of example only.

In other embodiments, only subsets of these components, or additional or alternative sets of components, may be used, and such components may exhibit alternative functionality and configurations.

For example, in other embodiments, functionality for backup control and associated automated snapshot-based processing can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

As another example, it is possible in some embodiments that the source storage system and the target storage system can comprise the same storage system. In such an arrangement, a backup process is illustratively implemented to backup data from one portion of the storage system to another portion of the storage system. The terms "source storage system" and "target storage system" as used herein are therefore intended to be broadly construed so as to encompass such possibilities.

The operation of the information processing system 100 will now be described in further detail with reference to the flow diagram of the illustrative embodiment of FIG. 2, which implements backup control utilizing content-based signatures. The steps of the process involve interactions between a source storage system and a target storage system, more particularly designated as a generic storage array and a content addressable storage ("CAS") system, respectively, illustratively utilizing backup control logic instances of storage controllers of those source and target storage systems.

The FIG. 2 process as shown includes steps 200 through 212, and is suitable for use in conjunction with a backup process performed in system 100 but is more generally applicable to other types of information processing systems in which data is backed up from a source storage system to a target storage system.

In step 200, the generic storage array sends a complete PIT replica of at least one storage volume to the CAS system as part of an ongoing backup process carried out between those two storage systems. It is assumed in the present embodiment that the complete PIT replica is a type of "snapshot" as that term is broadly used herein, although other types of snapshots can be used in other embodiments. The complete PIT replica is illustratively generated utilizing a snapshot generator such as snapshot generator 114S in the storage controller 108S of source storage system 102S, although it can be generated using alternative techniques. The storage volume for which the complete PIT replica is generated is illustratively one of a plurality of logical storage volumes stored in the generic storage array, such as one of the storage volumes 110S of source storage system 102S, that is designated for backup to a corresponding one of the storage volumes 110T of target storage system 102T. Multiple storage volumes can be designated for backup as part of the backup process in step 200. For example, one or more sets of storage volumes each comprising a plurality of storage volumes can be designated. It will be assumed for clarity and simplicity of the following description that a single storage volume is designated, but the techniques described can be extended in a straightforward manner to multiple designated storage volumes as well as multiple sets of storage volumes.

In step 202, the CAS system selects a page of the received PIT replica and generates a hash handle for the page. The hash handle is an example of what is more generally referred to herein as a "content-based signature." Other types of content-based signatures can be used in other embodiments. The hash handles are illustratively generated by a signature generator such as signature generator 116T in the storage controller 108T of target storage system 102T, by application of a hash function such as SHA1 to content of respective ones of the pages.

In step 204, a determination is made in the CAS system as to whether or not the hash handle of the selected page is the same as a previous hash handle of a page with the same logical address in a previous PIT replica. If the hash handles are not the same, the selected page is not a duplicate of the corresponding page in the previous PIT replica, and the process moves to step 206 to process the selected page. Otherwise, the selected page is a duplicate page relative to the corresponding page in the previous snapshot, and the process moves to step 210.

In step 206, the CAS system first determines whether or not the selected page is a duplicate of another page that is already stored. For example, the selected page may be a duplicate of a page having a different logical address, in which case the selected page is already stored in the CAS system. The CAS system therefore adjusts a corresponding reference count, and retains the hash handle of the selected page in memory. If the selected page is a non-duplicate page, the CAS system stores the non-duplicate page and retains its hash handle in memory. The process then moves to step 208.

In step 208, the CAS system updates a tree structure maintained for a snapshot group corresponding to the designated storage volume. The snapshot group in this embodiment includes the above-noted PIT replicas. The process then moves to step 212. An example of a tree structure maintained for a snapshot group comprising PIT replicas in an illustrative embodiment will be described in more detail below in conjunction with FIG. 3.

In step 210, which is reached if the hash handle of the selected page of the received PIT replica is the same as the hash handle of the corresponding page in the previous PIT replica, the CAS system does not store the duplicate page and does not retain its hash handle in memory. The process then skips steps 206 and 208 and moves directly to step 212 as shown.

In step 212, a determination is made as to whether or not there are any additional pages of the received PIT replica to be processed. If there is at least one additional page of the received PIT replica to be processed, the process returns to step 202 to select another page and to generate a hash handle for that page, after which the determination in step 204 is repeated and the process continues. If it is determined in step 212 that all of the pages of the received PIT replica have been processed, the process returns to step 200 to await the receipt of the next PIT replica of the designated storage volume from the generic storage array.

The FIG. 2 process continues for as long as the storage volume is designated for backup from the generic storage array to the CAS system. The process can be terminated under various conditions, possibly specified by or under the control of the backup control logic 112, such as termination of the backup process for the designated storage volume. Other examples of conditions that can lead to termination of the process include a change in the designation previously made in step 200, a remapping, rezoning or other reconfiguration of one or more of the storage volumes 110 within the storage systems 102, or deletion of the designated storage volume from the storage systems 102.

The PIT replicas and/or other snapshots generated by a given storage system in conjunction with the FIG. 2 process may be utilized to perform one or more automated actions in the storage system. For example, the storage system may utilize one or more snapshots to support automated rollback of a storage volume or set of storage volumes to a previous point in time, or to perform synchronous or asynchronous replication of data of one or more storage volumes from the storage system to another storage system or to another portion of the same storage system. These and numerous other automated actions may be taken utilizing snapshots generated in a given storage system in conjunction with the FIG. 2 process.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for backup control utilizing content-based signatures. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different backup processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 2 process in the system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

Figure 3:
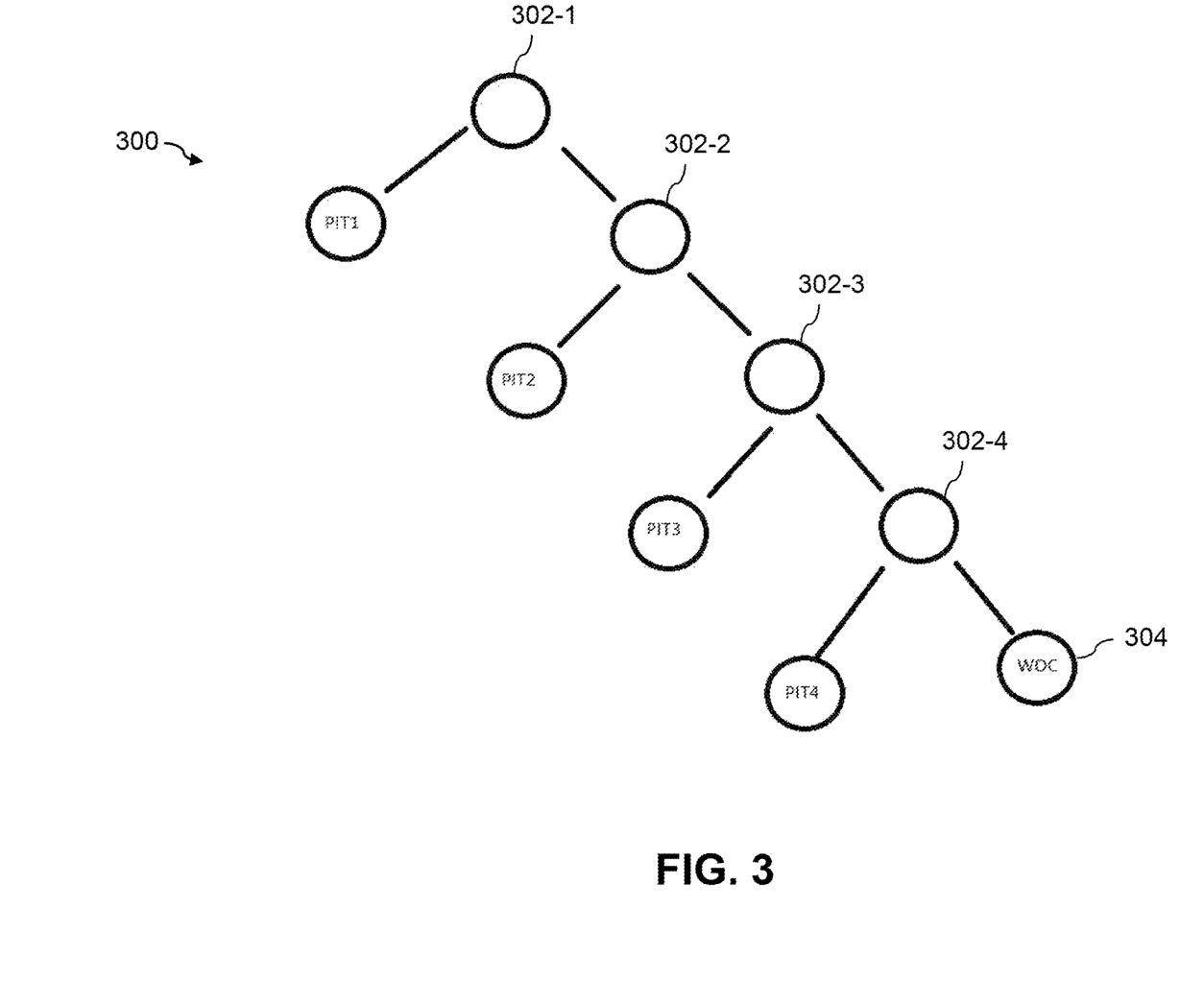
FIG. 3 shows an example of a tree structure used to store information characterizing a given snapshot group comprising a plurality of snapshots having ancestor relationships in an illustrative embodiment.

Referring now to FIG. 3, a tree structure 300 is used to store information characterizing a given snapshot group for a particular storage volume that is designated for backup from a source storage system without content addressable storage functionality to a target storage system with content addressable storage functionality using the FIG. 2 process. The tree structure 300 illustrates ancestor relationships between the snapshots of the snapshot group, although other types of structures used in other embodiments, such as structures providing logical views, need not explicitly show such ancestor relationships. In the tree structure 300, a storage volume designated for backup in accordance with the FIG. 2 process changes over time and those changes are captured by snapshots 302-1, 302-2, 302-3 and 302-4, which correspond to respective PIT replicas PIT1, PIT2, PIT3 and PIT4.

The PIT replicas PIT1 through PIT4 represent respective different available backup points in time. An additional node 304 is illustratively associated with a current "Working On Copy" or WOC of the storage volume, where the WOC will eventually be used to generate another PIT replica PIT5 that is not shown in the figure. The additional node 304 illustratively represents a given received PIT replica that is currently being processed through the page-based processing of the FIG. 2 process and which will eventually form PIT5 once the page-based processing of that received PIT replica is complete.

For each page in the given received PIT replica of the storage volume, the backup process of FIG. 2 compares the hash handle of that page to the hash handle of the corresponding page in a previous PIT replica. The previous PIT replica in this example illustratively corresponds to snapshot 302-4, which is a common ancestor node of both PIT4 and the additional node 304 in the tree structure 300. Duplicate pages already in PIT4 are not stored and therefore will not become part of the next PIT replica PIT5 of the tree structure 300. As noted above, PIT5 is completed and fully incorporated into the tree structure 300 after all pages of the given received PIT replica have been processed.

The tree structure 300 is considered an example of a "snapshot tree," and other types of snapshot trees can be used in other embodiments. The term "snapshot" as used herein is also intended to be broadly construed, and in some embodiments may encompass a complete PIT replica or other types of information characterizing the state of a given storage volume at a particular time.

Also, other arrangements of data structures can be used in other embodiments, and the term "tree structure" as used herein is intended to be broadly construed so as to encompass numerous alternative data structures for maintaining information characterizing snapshots for at least one storage volume.

Accordingly, the particular tree structure shown in FIG. 3 is only an example, and should not be construed as limiting in any way. Alternative structures can be implemented using a table or any of a wide variety of different data structures or other storage arrangements suitable for storing information characterizing a snapshot group.

In some embodiments, the storage system comprises an XtremIO™ storage array or other type of content addressable storage system suitably modified to incorporate backup control techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The storage controller 408 in the present embodiment is configured to implement backup control functionality of the type previously described in conjunction with FIGS. 1 through 3. Accordingly, the content addressable storage system 405 illustratively participates as a target storage system in a backup process with a source storage system that comprises a generic storage system lacking content addressable storage functionality. For example, the content addressable storage system 405 may be viewed as representing an illustrative embodiment of the target storage system 102T of system 100 in FIG. 1.

The storage controller 408 includes distributed modules 412, 414 and 416, which are configured to operate in a manner similar to that described above for respective corresponding backup control logic 112T, snapshot generator 114T and signature generator 116T of the storage controller 108T of target storage system 102T in system 100.

Module 412 is more particularly referred to as distributed backup control logic, and illustratively comprises multiple backup control logic instances on respective ones of a plurality of distinct nodes. Similarly, module 414 is more particularly referred to as a distributed snapshot generator, and illustratively comprises multiple snapshot generation instances on respective ones of the distinct nodes, and module 416 is more particularly referred to as a distributed signature generator, and illustratively comprises multiple signature generation instances on respective ones of the distinct nodes.

Figure 4:
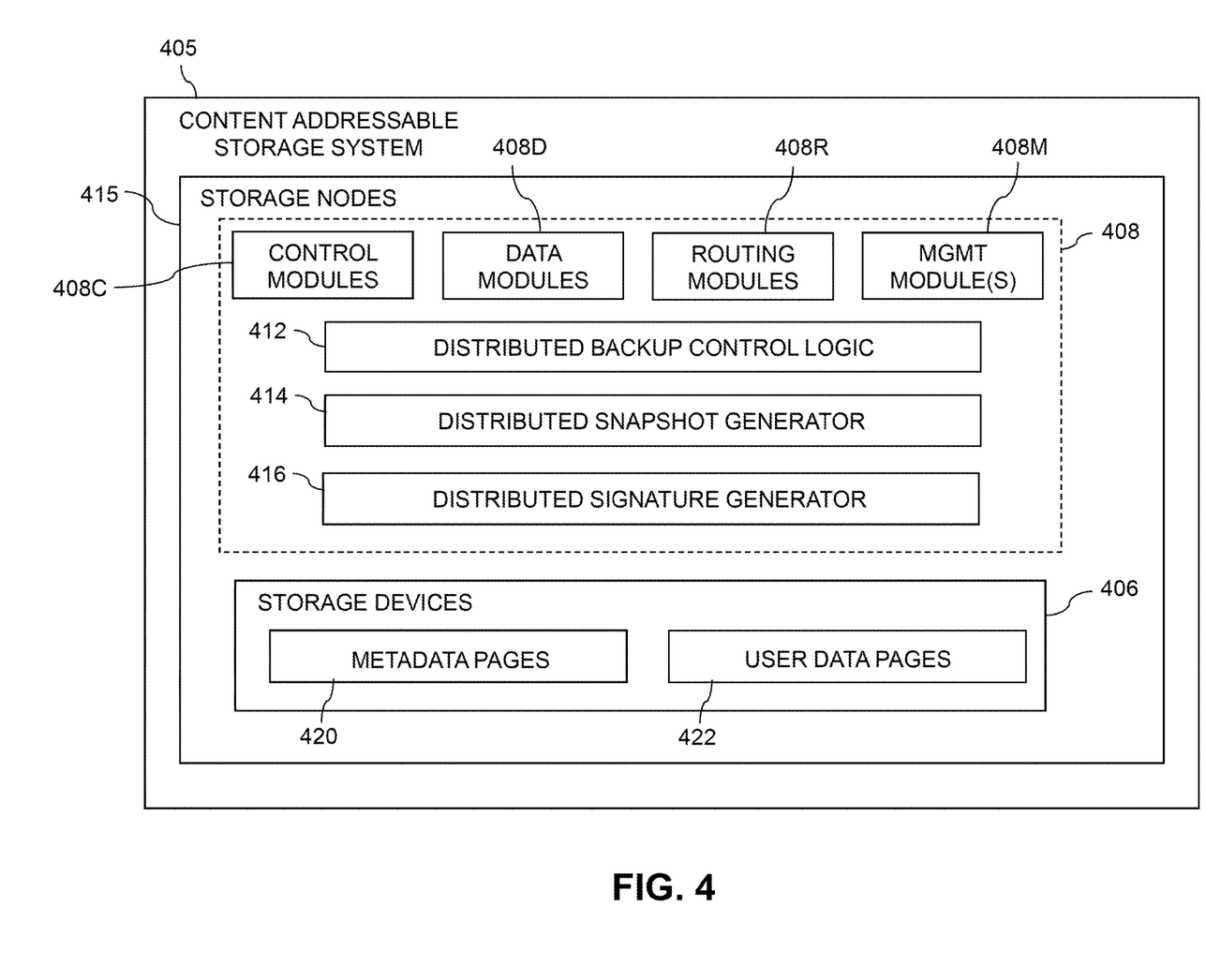
FIG. 4 shows a content addressable storage system having a distributed storage controller configured with functionality for backup control utilizing content-based signatures in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412, 414 and 416 in the present embodiment are assumed to be distributed at least in part over at least a subset of the other modules 408C, 408D, 408R and 408M of the storage controller 408. Accordingly, at least portions of the backup control functionality of the modules 412, 414 and 416 may be implemented in one or more of the other modules of the storage controller 408. In other embodiments, the modules 412, 414 and 416 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which storage volume snapshots are stored in a tree structure using modules 412, 414 and 416 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The backup control functionality provided by modules 412, 414 and 416 in this embodiment is assumed to be distributed across multiple distributed processing modules, including at least a subset of the processing modules 408C, 408D, 408R and 408M of the distributed storage controller 408.

For example, the management module 408M of the storage controller 408 may include a backup control logic instance that engages corresponding backup control logic instances in all of the control modules 408C and routing modules 408R in order to implement a backup control process.

In some embodiments, the content addressable storage system 405 comprises an XtremIO™ storage array suitably modified to incorporate techniques for backup control utilizing content-based signatures as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, backup control functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement backup control functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with backup control functionality as disclosed herein can provide a number of significant advantages relative to conventional arrangements.

For example, some embodiments are advantageously configured to allow at least one storage volume of a generic storage array or other type of generic storage system that does not have content addressable storage functionality to be backed up in a content addressable storage system.

Such arrangements can automatically avoid storage of duplicate pages detected in multiple snapshots of the storage volume, while also reducing the amount of memory needed to store content-based signatures, thereby conserving both storage and memory resources in the backup process.

Accordingly, illustrative embodiments disclosed herein can considerably reduce the amounts of target storage system resources that are consumed in backing up one or more storage volumes of a generic storage system.

For example, some embodiments avoid the need to store multiple complete PIT replicas of a given storage volume for respective snapshots in situations in which there are relatively small numbers of changed pages between the snapshots.

Moreover, the need for a separate backup appliance with large amounts of memory and storage capacity is eliminated.

The backup process in some embodiments provides highly efficient storage of a backed up storage volume utilizing content-based signatures to provide deduplication functionality not otherwise available in the generic storage system.

Functionality for backup control and associated automated snapshot-based processing can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with backup control functionality will now be described in greater detail with reference to FIGS. 5 and 6. Although described in the context of system 100, these platforms may also be used to implement at least portions of other information processing systems in other embodiments.

Figure 5:
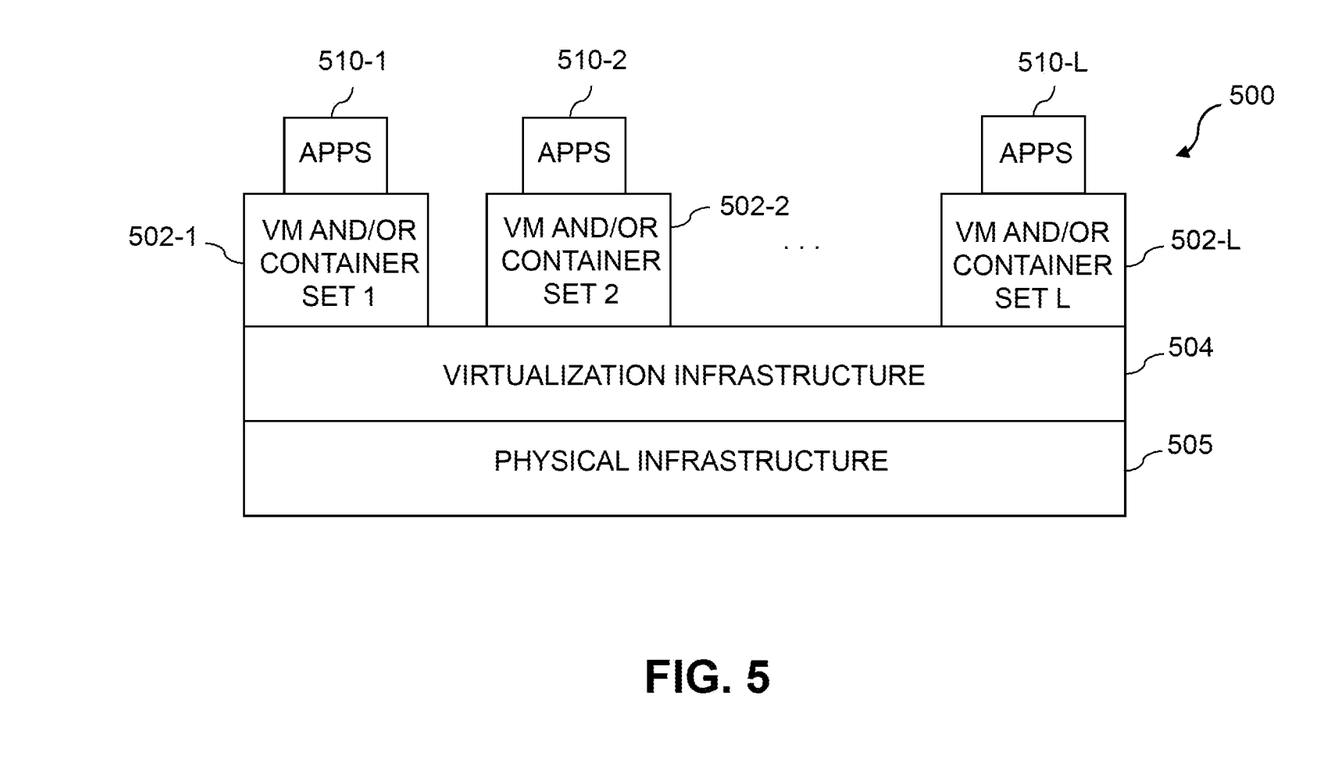
FIGS. 5 and 6 show examples of processing platforms that may be utilized to implement at least a portion of an information processing system in illustrative embodiments.
Figure 6:
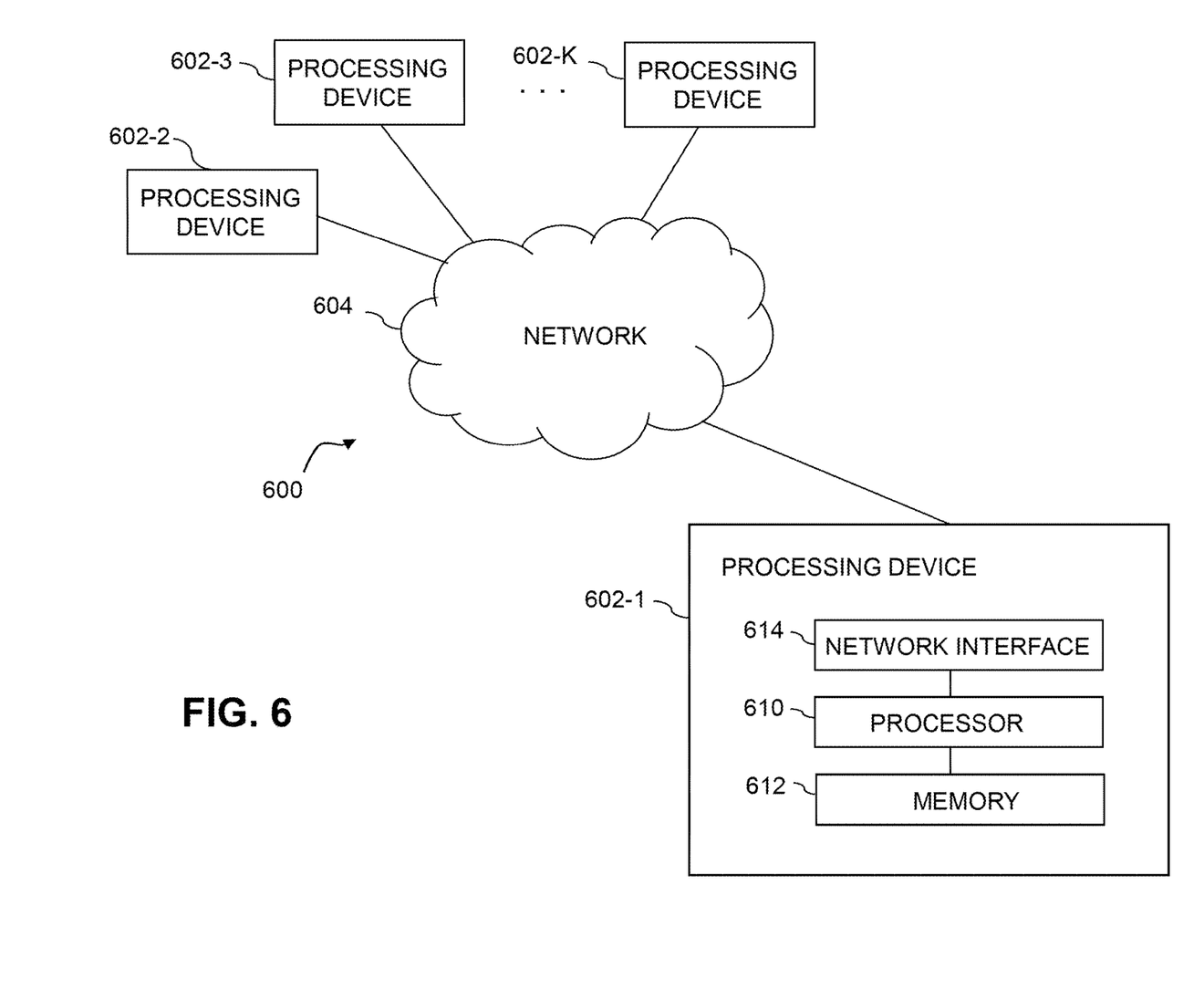

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide backup control functionality of the type described above for one or more processes running on a given one of the VMs. For example, each of the VMs can implement backup control logic and associated snapshot generators for providing backup control functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide backup control functionality of the type described above. For example, a container host device supporting multiple containers of one or more container sets can implement one or more instances of backup control logic and associated snapshot generators for providing backup control functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the backup control functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, backup control processes and associated control logic and data structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a content addressable storage system comprising a plurality of storage devices and a storage controller;
    the storage controller comprising one or more processing devices each comprising a processor coupled to a memory;
    the content addressable storage system being configured:
    to receive from another storage system a plurality of snapshots for at least one storage volume designated for backup from the other storage system to the content addressable storage system;
    for each of a plurality of pages of a given one of the snapshots:
    to generate a content-based signature for the page;
    to compare the content-based signature for the page to a previous content-based signature generated for a corresponding page having the same address in a previous one of the snapshots; and
    to store the page of the given snapshot in one or more of the storage devices of the content addressable storage system responsive to an absence of a match between the compared content-based signatures;
    wherein the page is not stored in one or more of the storage devices of the content addressable storage system if its content-based signature matches the previous content-based signature generated for the corresponding page having the same address in the previous one of the snapshots;
    wherein the content-based signature generated for the page is not stored in a designated memory of the content addressable storage system if that content-based signature matches the previous content-based signature generated for the corresponding page having the same address in the previous one of the snapshots;
    wherein the content addressable storage system is configured to store at least portions of the received snapshots for the storage volume in a tree structure in which the snapshots are designated as collectively comprising a snapshot group; and
    wherein each of one or more child snapshots of the snapshot group in the tree structure is stored in the content addressable storage system without storing those pages of the child snapshot that have respective content-based signatures that are the same as those of corresponding pages of a parent snapshot of the snapshot group in the tree structure.

2. The apparatus of claim 1 wherein the storage volume comprises at least one logical storage volume of the other storage system.

3. The apparatus of claim 1 wherein the other storage system comprises a generic storage system without content addressable storage functionality.

4. The apparatus of claim 1 wherein the previous one of the snapshots comprises a snapshot immediately preceding the given snapshot in a sequence of snapshots for the storage volume received from the other storage system.

5. The apparatus of claim 1 wherein the content-based signatures are generated by applying a designated hash function to content of respective ones of the pages.

6. The apparatus of claim 1 wherein the content-based signatures comprise respective hash handles of the pages.

7. The apparatus of claim 1 wherein the designated memory comprises a signature memory of the content addressable storage system.

8. The apparatus of claim 1 wherein the content addressable storage system comprises a clustered storage system having a plurality of storage nodes each comprising a different subset of the plurality of storage devices.

9. The apparatus of claim 8 wherein the storage controller comprises a distributed storage controller comprising backup control logic instances implemented in respective ones of the storage nodes.

10. The apparatus of claim 8 wherein each of the storage nodes of the content addressable storage system further comprises a set of processing modules configured to communicate over one or more networks with corresponding sets of processing modules on other ones of the storage nodes, the sets of processing modules of the storage nodes collectively comprising at least a portion of the storage controller.

11. A method comprising:
receiving in a content addressable storage system from another storage system a plurality of snapshots for at least one storage volume designated for backup from the other storage system to the content addressable storage system;
for each of a plurality of pages of a given one of the snapshots:
generating a content-based signature for the page;
comparing the content-based signature for the page to a previous content-based signature generated for a corresponding page having the same address in a previous one of the snapshots; and
storing the page of the given snapshot in one or more storage devices of the content addressable storage system responsive to an absence of a match between the compared content-based signatures;
wherein the page is not stored in one or more of the storage devices of the content addressable storage system if its content-based signature matches the previous content-based signature generated for the corresponding page having the same address in the previous one of the snapshots;
wherein the content-based signature generated for the page is not stored in a designated memory of the content addressable storage system if that content-based signature matches the previous content-based signature generated for the corresponding page having the same address in the previous one of the snapshots;
wherein the content addressable storage system is configured to store at least portions of the received snapshots for the storage volume in a tree structure in which the snapshots are designated as collectively comprising a snapshot group;
wherein each of one or more child snapshots of the snapshot group in the tree structure is stored in the content addressable storage system without storing those pages of the child snapshot that have respective content-based signatures that are the same as those of corresponding pages of a parent snapshot of the snapshot group in the tree structure; and
wherein the method is implemented by at least one processing device comprising a processor coupled to a memory.

12. The method of claim 11 wherein the content-based signatures are generated by applying a designated hash function to content of respective ones of the pages.

13. The method of claim 11 wherein the content-based signatures comprise respective hash handles of the pages.

14. The method of claim 11 wherein the designated memory comprises a signature memory of the content addressable storage system.

15. The method of claim 11 wherein the storage volume comprises at least one logical storage volume of the other storage system.

16. The method of claim 11 wherein the other storage system comprises a generic storage system without content addressable storage functionality.

17. A computer program product comprising a non-transitory processor-readable storage medium having stored therein program code of one or more software programs, wherein the program code when executed by at least one processing device causes said at least one processing device:
to receive in a content addressable storage system from another storage system a plurality of snapshots for at least one storage volume designated for backup from the other storage system to the content addressable storage system;
for each of a plurality of pages of a given one of the snapshots:
to generate a content-based signature for the page;
to compare the content-based signature for the page to a previous content-based signature generated for a corresponding page having the same address in a previous one of the snapshots; and
to store the page of the given snapshot in one or more storage devices of the content addressable storage system responsive to an absence of a match between the compared content-based signatures;
wherein the page is not stored in one or more of the storage devices of the content addressable storage system if its content-based signature matches the previous content-based signature generated for the corresponding page having the same address in the previous one of the snapshots;
wherein the content-based signature generated for the page is not stored in a designated memory of the content addressable storage system if that content-based signature matches the previous content-based signature generated for the corresponding page having the same address in the previous one of the snapshots;
wherein the content addressable storage system is configured to store at least portions of the received snapshots for the storage volume in a tree structure in which the snapshots are designated as collectively comprising a snapshot group; and
wherein each of one or more child snapshots of the snapshot group in the tree structure is stored in the content addressable storage system without storing those pages of the child snapshot that have respective content-based signatures that are the same as those of corresponding pages of a parent snapshot of the snapshot group in the tree structure.

18. The computer program product of claim 17 wherein the content-based signatures are generated by applying a designated hash function to content of respective ones of the pages.

19. The computer program product of claim 17 wherein the content-based signatures comprise respective hash handles of the pages.

20. The computer program product of claim 17 wherein the designated memory comprises a signature memory of the content addressable storage system.

* * * * *